(12) United States Patent
Kurek et al.

(10) Patent No.: US 6,169,141 B1
(45) Date of Patent: Jan. 2, 2001

(54) TWO-COMPONENT POLYURETHANE COATING COMPOSITION WITH ANTI-CORROSIVE PROPERTIES

(75) Inventors: Gerald Kurek; Jürgen Schwindt, both of Leverkusen; Peter Jahn, Bergisch Gladbach, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/311,681

(22) Filed: May 13, 1999

(30) Foreign Application Priority Data

May 22, 1998 (DE) .............................. 198 22 842

(51) Int. Cl.$^7$ .............................. C08J 3/00; C08K 3/20; C08L 75/00

(52) U.S. Cl. .............................. 524/589; 524/372; 524/590; 524/757; 524/874; 528/44; 528/60; 528/61; 528/64; 528/49

(58) Field of Search .............................. 524/589, 590, 524/372, 757, 874; 528/44, 60, 61, 64, 49

(56) References Cited

U.S. PATENT DOCUMENTS

| | | | |
|---|---|---|---|
| 3,893,967 | 7/1975 | Sunder-Plassmann et al. | 260/32.8 A |
| 4,598,114 | * 7/1986 | Berens | 524/345 |
| 5,021,535 | * 6/1991 | Vu et al. | 528/66 |
| 5,214,086 | 5/1993 | Mormile et al. | 531/237 |
| 5,391,686 | 2/1995 | Jadhav et al. | 528/77 |
| 5,489,704 | 2/1996 | Squiller et al. | 699/35 |
| 5,516,873 | 5/1996 | Hicks et al. | 528/60 |
| 5,591,807 | 1/1997 | Cai et al. | 525/381 |
| 5,623,045 | 4/1997 | Zwiener et al. | 689/68 |
| 5,661,216 | 8/1997 | Laginess et al. | 524/871 |
| 5,821,326 | 10/1998 | Kurek et al. | 816/332 |

* cited by examiner

Primary Examiner—Patrick D. Niland
(74) Attorney, Agent, or Firm—Joseph C. Gil; Thomas W. Roy

(57) ABSTRACT

The present invention relates to a coating composition containing:

A) 25 to 50 wt. % of a polyisocyanate component,
B) 5 to 20% wt. % of one or more polyaspartic acid esters
C) 10 to 30 wt. % of one or more polyaldimines having a number average molecular weight of 112 to 600
D) 0.1 to 5.0 wt. % of an acetal corresponding to formula IV:

(IV)

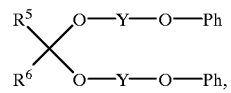

E) 0.1 to 5.0 wt. % of castor oil.
F) 0.1 to 10.0 wt. % of an organic solvent,
G) 15 to 35 wt. % of a pigment and
H) 0 to 10 wt. % of a coating additive other than D, F or G, wherein the sum of the percentages of components A to H is 100. The present invention also relates to the use of this coating composition as an anti-corrosive top coat.

14 Claims, No Drawings

TWO-COMPONENT POLYURETHANE COATING COMPOSITION WITH ANTI-CORROSIVE PROPERTIES

BACKGROUND OF THE INVENTION

1. Field of the Invention

The present invention relates to high solids coating compositions containing polyaspartic acid esters, polyaldimines, polyisocyanates and special additives, and to their use for preparing anti-corrosive topcoats.

2. Description of the Prior Art

The annual damage caused by corrosion worldwide is estimated at more than $50 billion, so that the development of ever better anti-corrosive coatings is of great importance. As in almost all areas of coatings technology, more stringent requirements specifying a significant reduction in the solvent content of coating compositions must be taken into consideration in the development of these compositions. For example, the US authorities require a VOC content of max. 340 g/l for anti-corrosive topcoats. TL sheet 95 of the German Railways specifies a minimum solids content of 65 vol. % for low-solvent two-component (2K) topcoat compositions. If these specifications are complied with and a combination of hydroxy-functional polyacrylate resins with polyisocyanates is used as the 2K polyurethane (PU) system, it is only possible to prepare coatings having a maximum thickness of 50 µm. The application of thicker layers is associated here with a lack of non-sag properties.

Therefore, it is an object of the present invention to provide 2K PU top coat compositions which have a solids content of at least 80 vol. % and may be applied in thicknesses of up to 180 µm, which previously was not possible without blistering. It is an additional object of the present invention to provide compositions having a viscosity which is sufficiently low such that there are no substantial limitations on the method chosen for applying the coating. Finally, it is an object of the present invention of provide compositions having a sufficiently long pot life in combination with a short drying time so that optimum surface protection is obtained as rapidly as possible.

These objects can be achieved with the high solids, 2K PU coating compositions of the present invention which contain polyisocyanates and certain amino-functional reactive thinners as reaction components in combination with a special blend of additives.

The amino-functional reactive thinners are polyaspartic acid esters, polyketimines and polyaldimines, such as those described, e.g., in EP-A 0 689 881. In polyaspartic acid esters the otherwise very high reactivity of amino groups with isocyanate groups is reduced by steric and electronic effects ("hindered amines"). In polyketimines and polyaldimines the primary amino groups are blocked by reaction with aldehydes or ketones to form imino groups, and only regain their reactivity by hydrolysis or the action of heat (rearrangement reactions). Curing of these polyamines with polyisocyanates results in coatings with very good mechanical properties.

Compositions containing polyisocyanates, polyaspartic acid esters and polyaldimines or polyketimines and their use as a binder in 2K PU high-solids paints are known.

EP-A 0 531,249 describes the use of a binder mixture of polyisocyanates, polyaldimines or polyketimines and polyaspartic acid esters exclusively with hydroxy-functional compounds automotive refinish compositions. EP-A 0,699,696 describes a blend of polyisocyanates, polyaspartic acid esters, polyaldimines and mixed aspartic acid ester/aldimines corresponding to formula 1:

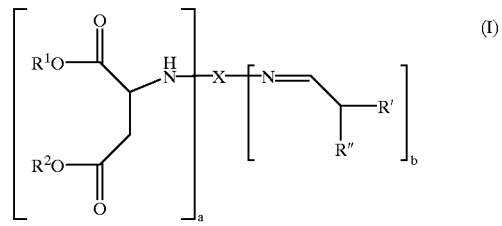

wherein

X is an alkylene radical and a and b are integers between 1 and 5 and a+b is an integer between 2 and 6.

Better compatibility between the polyisocyanate component and the aldimine component is mentioned as an advantage of this mixture.

Compositions containing only polyisocyanates, polyketimines or polyaldimines and polyaspartic acid esters—optionally together with the additives known from coatings technology—are described in EP-A 0,689,881. Coatings having a solids content of up to 95 wt. % can be achieved with these binder compositions. Such high solids, coating compositions not only are of great interest ecologically, but are also of economic importance because of the low solvent content. However, it is found that coatings produced therefrom no longer meet the special requirements of an anti-corrosive top coat with respect to adequate coating thickness and the absence of cracks.

When these coating compositions are applied in coating thicknesses of more than 80 mm, "sagging" as a result of insufficient non-sag properties, and 120 mm blisters in the coating are observed.

It has now been found that coating compositions containing polyisocyanates, polyaspartic acid esters and polyketimines or polyaldimine in combination with a special additive combination of bis-(2-phenoxyethyl) formal and castor oil, can satisfy the requirements of a high solids, anti-corrosive top coat composition:

i) a high solids content of >90 wt. %), ii) good non-sag properties, i.e., no sagging on vertical surfaces, iii) no blistering during drying of the coating, iv) adequate pot lives, v) dry times of less than 8 hours, vi) diverse application possibilities, vii) layer thicknesses of up to 180 nm, viii) very good adhesion, ix) no cracking in the coating on heating and x) resistance of the coating to weathering.

SUMMARY OF THE INVENTION

The present invention relates to a coating composition containing

A) 25 to 50 wt. % of a polyisocyanate component,

B) 5 to 20% wt. % of one or more polyamines corresponding to formula II:

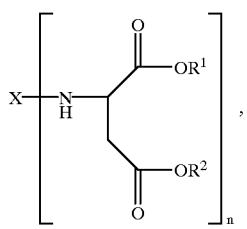

(II)

wherein

X represents an n-valent radical which is inert towards isocyanate groups and is obtained by removing the primary amino groups from an organic polyamine having a number average molecular weight of 88 to 400 and containing n primary (cyclo)aliphatically bound amino groups, $R^1$ and $R^2$ are identical or different and represent organic radicals having 1 to 18 carbon atoms and n represents an integer of at least 2, C) 10 to 30 wt. % of one or more compounds having a number average molecular weight of 112 to 600 and corresponding to formula III:

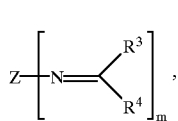

(III)

wherein $R^3$ and $R^4$ are identical or different and represent hydrogen or organic radicals having 1 to 18 carbon atoms and Z represents an m-valent radical which is inert towards isocyanate groups and is obtained by removing the primary amino groups from an organic polyamine having a number average molecular weight of 88 to 400 and containing m primary (cyclo)aliphatically bound amino groups and m represents an integer $\geq 2$, D) 0.1 to 5.0 wt. % of acetals corresponding to formula IV:

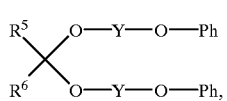

(IV)

wherein $R^5$ and $R^6$ are identical or different and represent hydrogen or organic radicals having 1 to 18 carbon atoms, Y represents a divalent organic radical having 1 to 8 carbon atoms and Ph represents an optionally substituted phenyl radical, E) 0.1 to 5.0 wt. % of castor oil.

F) 0.1 to 10.0 wt. % of one or more organic solvents,

G) 15 to 35 wt. % of one or more pigments

H) 0 to 10 wt. % of one or more coating additives other than D, F or G, wherein the sum of the percentages of components A to H is 100.

The present invention also relates to the use of this coating composition as an anti-corrosive topcoat.

DETAILED DESCRIPTION OF THE INVENTION

Suitable polyisocyanates A for the coating compositions according to the invention include the known lacquer polyisocyanates which have (cyclo)aliphatically bound isocyanate groups. Examples include derivatives of (cyclo)aliphatic diisocyanates having a molecular weight of 168 to 300, such as hexamethylene diisocyanate, 2,2,4- and/or 2,4,4-trimethyl hexamethylene diisocyanate, 2-methyl-1,5-diisocyanatopentane, 1,4-diisocyanatocyclohexane, 1-isocyanato-3,3,5-trimethyl-5-isocyanatomethyl-cyclohexane (IPDI) and/or 1-isocyanato-1-methyl-3(4) isocyanatomethyl-cyclohexane.

The "derivatives" of these starting diisocyanates include the known lacquer polyisocyanates which are prepared from these diisocyanates and contain biuret groups, isocyanurate groups, isocyanurate and uretdione groups, isocyanurate and allophanate groups, or urethane groups. The corresponding derivatives of aromatic diisocyanates, such as 2,4- and/or 2,6-diisocyanatotoluene, are also suitable in principle. The lacquer polyisocyanates containing urethane groups are preferably those based on low molecular weight polyhydroxy compounds having a number average molecular weight of 62 to 299, such as ethylene glycol, propylene glycol and/or trimethylolpropane.

Preferred lacquer polyisocyanates A are the derivatives which contain isocyanurate groups, are prepared from hexamethylene diisocyanate and have an NCO content of 16 to 24 wt. % and a maximum viscosity at 23° C. of 5,000, preferably 3,000, and more preferably 1,500 mPa.s. These lacquer polyisocyanates can also contain uretdione, biuret, allophanate, urea and/or polyurethane groups. Mixtures of two or more of the preceding polyisocyanates can also be used as polyisocyanate component A.

Component B is selected from compounds corresponding to formula II wherein X, $R^1$, $R^2$ and n have the meaning already given above. Preferred compounds of this type, which are also known as polyaspartic acid esters or polyaspartates, are those wherein n represents 2. More preferred are polyaspartic esters wherein X represents a divalent hydrocarbon radical having 6 to 30 carbon atoms, such as the radicals obtained by removing the amino groups from 1-amino-3,3,5-trimethyl-5-aminomethyl-cyclohexane, 4,4'-diaminodicyclohexyl methane, 3,3'-dimethyl-4,4'-diaminodicyclohexyl methane, hexahydro-2,4- and/or -2,6-diaminotoluene, the isomeric C-monomethyl-diaminodicyclohexyl methanes and 3(4)-aminomethyl-1-methyl-cyclohexylamine. Most preferred are compounds corresponding to formula II wherein X represents the divalent hydrocarbon radical obtained by removing the amino groups from 3,3'-dimethyl-4,4'-diaminodicyclohexylmethane.

Preferred starting components B include those compounds corresponding to formula II wherein $R^1$ and $R^2$ represent methyl, ethyl, n-butyl or 2-ethylhexyl, more preferably an ethyl.

Starting compounds B are prepared in known manner by the reaction of primary polyamines corresponding to the formula, $X—(—NH_2)_n$, with maleic or fumaric acid esters corresponding to the formula $R^1OOC—CH=CH—COOR^2$, wherein $R^1$, $R^2$, n and X have the meanings previously set forth. The polyaspartic acid esters, their preparation and the polyamines and maleic or fumaric acid esters used for their preparation are described, for example, in EP-A 0,689,881 and EP-A 0,816,326 U.S. Pat. Nos. 5,623,045 and 5,821,326, herein incorporated by reference).

Mixtures of two or more compounds corresponding to formula II can also used as component B.

Component C is selected from the polyaldimines or polyketimines that can be obtained, for example, by the reaction of carbonyl compounds corresponding to formula (V):

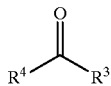

wherein $R^3$ and $R^4$ have the meaning previously set forth,
with polyamines containing primary amino groups, in which the polyamines may optionally be substituted by oxygen or nitrogen atoms.

Preferred polyaldimines or polyketimines include compounds corresponding to formula III wherein
$R^3$ and $R^4$ are identical or different and represent hydrogen or organic radicals having 1 to 18 carbon atoms, preferably alkyl radicals having 1 to 8 carbon atoms, provided that radicals $R^3$ and $R^4$ do not simultaneously represent hydrogen, or radicals $R^3$ and $R^4$, together with the imine carbon atom can form a 5- or 6-membered cycloaliphatic ring, Z represents an m-valent radical which is inert towards isocyanate groups and may be obtained by removing the primary amino groups from a polyamine having a number average molecular weight of 88 to 400 and containing m (cyclo)aliphatically bound amino groups and m represents an integer $\geq 2$, preferably 2.

Preferred compounds corresponding to formula III are polyaldimines, i.e., compounds corresponding to formula III in which all of the radicals $R^3$ represent hydrogen and the radicals $R^4$ represent hydrocarbon radicals having 1 to 8 carbon atoms, more preferably an isopropyl radical. Compounds of formula III in which Z represents a hydrocarbon radical obtained by removing the primary amino groups from 1-amino-3,3,5-trimethyl-5-aminomethylcyclohexane (IPDA) are particularly preferred.

The aldehydes or ketones which can be used for the preparation of the polyaldimines or polyketimines correspond to formula V and preferably have a molecular weight of 44 to 198; 58 to 198 for ketones and 44 to 128 for aldehydes.

Suitable aldehydes include acetaldehyde, propionaldehyde, n-butyraldehyde, isobutyraldehyde, trimethylacetaldehyde, 2,2-dimethylpropanal, 2-ethylhexanal, 3-cyclohexane-1-carboxaldehyde, hexanal, heptanal, octanal, valeraldehyde, benzaldehyde, tetrahydrobenzaldehyde, hexahydrobenzaldehyde, propargylaldehyde, p-toluylaldehyde, phenylethanal, 2-methylpentanal, 3methylpentanal, 4-methylpentanal and sorbaldehyde. Preferred are n-butyraldehyde, isobutyraldehyde, trimethylacetaldehyde, 2-ethylhexanal and hexahydrobenzaldehyde. Isobutyraldehyde is most preferred.

Suitable ketones include acetone, methyl ethyl ketone, methyl propyl ketone, methyl isopropyl ketone, methyl butyl ketone, methyl isobutyl ketone, methyl tert.-butyl ketone, methyl n-amyl ketone, methyl isoamyl ketone, methyl heptyl ketone. methyl undecyl ketone, diethyl ketone. ethyl butyl ketone, ethyl amyl ketone, diisopropyl ketone, diisobutyl ketone, cyclohexanone, cyclopentanone, methylcyclohexanone, isophorone, 5-methyl-3-heptanone, 1-phenyl-2-propanone, acetophenone, methyl nonyl ketone, dinonyl ketone and 3,3,5-trimethylcyclohexanone.

Preferred ketones are cyclopentanone, cyclohexanone, methylcyclopentanone, methylcyclohexanone, 3,3,5-trimethylcyclo-pentanone, cyclobutanone, methylcyclobutanone, acetone, methyl ethyl ketone and methyl isobutyl ketone. Methyl isobutyl ketone is most preferred.

Mixtures of various ketones or aldehydes and also mixtures of ketones with aldehydes can also be employed.

The polyamines employed for the preparation of compounds C are organic compounds which contain at least two, preferably two (m=2), (cyclo)aliphatically bound primary amino groups. The use of those amines which contain aromatically bound amino groups is also possible, but less preferred. The polyamines preferably have a number average molecular weight of 88 to 400. Suitable polyamines for the preparation of component C include the compounds previously disclosed as suitable for preparing component B, i.e., Z has the meaning in formula III that X has in formula (II). In each case different polyamines can be employed for the preparation of components B and C.

The polyaldimines or polyketimines are prepared by known methods by the reaction of the starting components, while maintaining a equivalent ratio of amino groups to aldehyde or ketone groups of 1:1 to 1:1.5. Optionally, catalytic amounts of acidic substances, such as p-toluenesulfonic acid, hydrogen chloride, sulfuric acid or aluminium chloride, can be used to accelerate the reaction.

The reaction may take place at a temperature range of 20 to 180° C. The reaction is optionally carried out using an entraining agent (e.g., toluene, xylene, cyclohexane or octane) to remove the water of reaction, until the calculated amount of water (1 mole of water per mole of primary amino group) has been split off or until no further water is split off. The phases are then separated, or the entraining agent and any unreacted educts present are removed by distillation. The resulting products can be employed as component C without further purification.

Component D is selected from the known plasticizers of coatings technology. These plasticizers correspond to formula IV wherein
$R^5$ and $R^6$ are identical or different and represent hydrogen or organic radicals having 1 to 18 carbon atoms, preferably hydrogen, Y represents a divalent organic radical having 1 to 8 carbon atoms, preferably an ethylene group and Ph represents a phenyl radical which may be substituted by Cl, Br or $C_1$–$C_4$-alkyl, preferably an unsubstituted group.

These compounds, which are referred to as acetals or ketals, may be obtained by the reaction of aldehydes or ketones with alcohols or ethyl orthoformate.

A compound corresponding to formula (IV)wherein $R^5$ and $R^6$ represent hydrogen, Y represents an ethylene group and Ph represents an unsubstituted phenyl group, which is preferably employed, is marketed as a plasticizer for coating compositions by Bayer AG under the tradename Desavin®.

Component E is castor oil, which is added to the coating composition according to the invention either as a separate component and/or as a constituent of one or more other components of the coating composition, e.g., as a suspension medium for a solid component in a paste.

Component F is selected from the known solvents of coatings technology, such as ethyl acetate, butyl acetate, methoxypropyl acetate, methyl ethyl ketone, methyl isobutyl ketone, N-methylpyrrolidone, benzine, chlorobenzene, Solvesso solvent and mixtures thereof. These solvents can be added to the coating composition according to the invention separately and/or as a constituent of one or more other components of the coating composition. The coating compositions according to the invention preferably comprises a maximum of 5 wt. %, more preferably 3 wt. %, solvent.

Component G is selected from one or more known pigments used in coatings and anti-corrosion technology.

Component H is selected from one or more of the additives known from coating technology, such as desiccants, dispersing aids, anti- sedimentation agents, flow control agents, fillers, catalysts, light stabilizers, anti-yellowing stabilizers and optionally plasticizers other than component D. The previously mentioned coatings properties according to the invention i) to x) can be obtained without component H, which is only used to obtain additional effects.

The coating compositions according to the invention contain components A to H in the following amounts, wherein all percentages are based on weight and wherein the sum of the percentages of components A to H in the coating compositions according to the invention is 100:

component A) 25–50%, preferably 30–45% and more preferably 35–39%;
component B) 5–20%, preferably 5–15% and more preferably 8–15%;
component C) 10–30%, preferably 10–20% and more preferably 13–18%;
component D) 0.1–5%, preferably 0.1–3% and more preferably 1–3%;
component E) 0.1–5%, preferably 0.1–4% and more preferably 1.5–3.5%;
component F) 0.1–10%, preferably 0.1–5% and more preferably 0.1–3%;
component G) 15–35%, preferably 20–30% and more preferably 24–28%;
and
component H) 0–10%, preferably 1–8% and more preferably 3–7%.

The preparation of the coating compositions according to the invention may be carried out by first mixing the individual components B to H. This mixing can be carried out in one or also in several successive steps. Before application, component A is added and incorporated thoroughly. The resulting coating compositions can be applied by brushing, spraying and rolling.

The substrates to be coated can be provided with suitable primers and base coats before they are coated with the coating compositions according to the invention. The coatings can be dried over a wide temperature range of –10 to 100° C.

The coating compositions according to the invention are very suitable as top coats, and in particular, as anti-corrosive top coats. The coatings produced with the coating compositions according to the invention are stable to chalking and to light and retain their color and gloss. It is possible to provide compositions having solids contents of up to 90 vol. % (including the aldehyde or ketone split off during curing), combined good non-sag properties, adequate pot life during processing and diverse application possibilities.

The recommended coating thickness is 60 µm, although in accordance with the requirements of DIN 55,928 or EN ISO 12,944, which will apply in the future, three times the coating thickness of 180 µm is possible without sagging due to a lack of non-sag properties and without the formation of blisters. The coating compositions according to the invention meet this requirement. In contrast to conventional systems, in which complete curing of the film takes up to 72 hours, curing of the coatings according to the invention has sufficiently progressed after 24 hours that a surface treatment, such as the removal of graffiti sprays with aggressive cleaning corn positions, results in no destruction of the film surface.

The surface protection which can be achieved with the coating compositions according to the invention is demonstrated by example 2. Example I (comparison example) demonstrates the marked decrease in film quality when the additive components, i.e, components D (Desavin, acetal type plasticizer) and E (castor oil, contained in Baylith L paste but not in Baylith L powder!) have been omitted. Coatings which crack under weathering conditions with exposure to heat are produced in this example. The absence of blistering and the higher maximum coating thickness are present in the coatings prepared in example 2 according to the invention.

The invention is further illustrated but is not intended to be limited by the following examples in which all parts and percentages are by weight unless otherwise specified.

EXAMPLES

The following starting materials are employed in the examples below (in parentheses is the letter used to define the particular component in the compositions according to the invention).

Polyisocyanate 1 (A)

A lacquer polyisocyanate containing isocyanurate groups, obtained by trimerization of hexamethylene diisocyanate, solvent-free, 22.5 wt. % NCO content, viscosity approx. 1,000 mPa.s/23° C. (Desmodur VP LS 2025/1, available from Bayer AG).

Polyisocyanate 2 (A)

A lacquer polyisocyanate containing isocyanurate and allophanate groups, based on hexamethylene diisocyanate, solvent-free. 19.5 wt. % NCO content, viscosity approx. 300 mPa.s/23° C. (Desmodur XP 7040E, available from Bayer AG).

Polyaspartate 1 (B)

A polyaspartic acid ester, obtained by the reaction of 1 mole of 3,3'-dimethyl-4,4'-diaminodicyclohexylmethane with 2 moles of diethyl maleate, 90% solution in butyl acetate (F), equivalent weight of the solution approx. 325 g/NH. viscosity of the solution approx. 130 mPa.s/23° C. (Desmophen VP LS 2973, available from Bayer AG).

Polyaspartate 2 (B)

A polyaspartic acid ester, obtained by the reaction of 1 mole 3,3'-dimethyl-4,4'-diaminodicyclohexylmethane with 2 moles of diethyl maleate (Desmophen XP 7068, available from Bayer AG). This resin corresponds to polyaspartic acid ester 1 with the exception that it does not contain solvent.

Polyaldimine 1 (C)

A polyaldimine obtained by the reaction of 1 mole of 1-amino-3,3,5-trimethyl-5-aminomethylcyclohexane with 2 moles of isobutyraldehyde, viscosity approx. 25 mPa.s/23° C., equivalent weight 139 g, (Desmophen VP LS 2142 or Desmophen XP 7076, available from Bayer AG).

Plasticizer 1 (D)

A plasticizer containing 100% bis(2-phenoxyethyl)formal (Desavin D, available from Bayer AG).

Additive 1 (H)

A zeolite additive, 50% in castor oil (E) (Baylith L paste, available from Bayer AG).

Additive 2 (H)

An zeolite additive without castor oil (Baylith L powder, available from Bayer AG).

Pigment 1 (G)

A titanium dioxide pigment (Bayertitan R-KB-4, available from Bayer AG).

Additive 3 (H)

A flow additive (H), 50% in ethyl acetate (F) (Acronal 700 L, available form BASF).

Additive 4 (H)

An anti-yellowing stabilizer (Tinuvin 292, available from Ciba Geigy)

Additive 5 (H)

An anti-blistering additive (Byk 085, available from Byk-Chemie)

Additive 6 (H)

A dispersing aid, 52% in a 1:1 blend of methylpropyl acetate and alkylbenzene (F) (Disperbyk 110, available from Byk-Chemie)

Additive 7 (H)

An anti-sag additive, 52% in N-methylpyrrolidone (F) (Byk 410, available from Byk-Chemie)

Additive 8 (H)

An additive, 3% in an 11:2 blend of alkylbenzene and isobutanol (F) (Byk 141, available from Byk-Chemie).

Pigment 2 (G)

A pigment (Raven Black 450, available from Byk-Chemie).

Example 1 (comparison example)

Polyaspartate 2, Polyaldimine 1, Additive 2, Pigment 1, Additive 3, Additive 4, Additive 8, Pigment 2 and Additive 6 were predispersed at 1,200 rpm for 10 minutes. The dispersion was then ground on a sand/bead mill, with cooling. Before application, Polyisocyanate 2 was added and incorporated thoroughly.

Example 2 (according to the invention)

Polyaspartate 1, Polyaldimine 1, Plasticizer 1, Additive 1, Pigment 1, Additive 3, Additive 4, Additive 5 (first portion) and Additive 6 were predispersed at 1,200 rpm for 10 minutes. The dispersion was then ground on a sand/bead mill, with cooling. After grinding Additive 7 and Additive 5 (second portion) were stirred in successively. Before application, Polyisocyanate 1 was added and incorporated thoroughly.

The composition of the 2K PU top coats from comparison example 1 and example 2 according to the invention are set forth in Table 1:

TABLE 1

Composition of the 2C PU top coats from comparison Example 1 and Example 2 according to the invention

| Components (contents state in wt. %) | Example 1 (comparison) | Example 2 (according to the invention) |
|---|---|---|
| Polyaspartate 2 | 11.23 | — |
| Polyaspartate 1 | — | 10.56 |
| Polyaldimine 1 | 16.81 | 15.73 |
| Plasticizer 1 | — | 1.93 |
| Additive 2 | 2.73 | — |
| Additive 1 | — | 5.14 |
| Pigment 1 | 27.58 | 25.94 |
| Additive 3 | 0.25 | 0.23 |
| Additive 4 | 0.61 | 0.56 |
| Additive 8 | 0.72 | — |
| Additive 5 (first portion) | — | 0.45 |
| Additive 6 | 0.86 | 0.81 |
| Pigment 2 | 0.15 | — |
| Additive 7 | — | 1.29 |
| Additive 5 (second portion) | — | 0.23 |
| Polyisocyanate 2 | 39.06 | — |
| Polyisocyanate 1 | — | 37.13 |
|  | 100.00 | 100.00 |
| NCO/NH equiv. ratio | — | Approx. 1.3 |

The properties of the coating compositions from Examples 1 and 2 are set forth in Table 2:

TABLE 2

|  | Example 1 (comparison) | Example 2 (according to the invention) |
|---|---|---|
| Pigment-Volume-Concentration | approx. 11% | approx. 11% |
| Weight of solids (%) | 98.7% | 98.0% |
| Volume of solids (%) | 98.1% | 97.0% |
| Processing time (h) | approx. 8 h | approx. 8 h |

The properties of the coatings obtained from the coating compositions of Examples 1 and 2 are set forth in Table 3:

TABLE 3

| 90 μm wet film | Example 1 (comparison) | Example 2 (according to the invention) |
|---|---|---|
| Drying according to DIN 53150 | | |
| T1 (h; sand drying) | 4 h | 3 h |
| T6 (h; pressure drying) | >8 h | 7 h |
| Pendulum hardness according to DIN 53157 7d-RT* | 177 s | 175 s |
| Resistance to solvent** 7d-RT exposure for 1 min | White spirit/ Solvent naphtha 100/ methoxypropyl acetate/ Acetone/ethanol | |
|  | 0/0/0/0/1 | 0/0/0/0/0 |
| Resistance to water 7d-RT* exposure for 4 h | Blistering | no blistering |
| Extensibility (DIN ISO 1520) 7d-RT* | 6.0 | 7.0 |
| Mandrel flex, con. Mandrel DIN ISO 6860; 7d-RT* | 20% | 16% |
| Max. coating thickness | | |
| - tendency to sage | from 80 μm | from 160 μm |
| - blistering | >120 μm | >160 μm |
| - flow (visual, the smaller the number the better) | 0–1 | 2 |
| Cracking on storage in heat Only top coating | | |
| - at 60° C. | over 50 days | over 50 days |
| - at 80° C. | over 50 days | over 50 days |
|  | 1KPU + | 1KPU + 2KPU top coat |

TABLE 3-continued

| 90 μm wet film | Example 1 (comparison) | Example 2 (according to the invention) |
|---|---|---|
| 3-coat structure | | |
| - at 60° C. | over 50 days | over 50 days |
| - at 80° C. | over 50 days | over 50 days |
| Properties of the coatings from Examples 1 and 2 | | |
| Corrosion tests | | |
| Coating structure: | | |
| Primer coating | 1K PU zinc dust | 1K PU - zinc dust |
| Intermediate coating | 1K PU - iron mica formulation Ex. 1 | 1K PU - mica dust formulation Ex. 2 |
| Top coating | | |
| Salt spray test DIN 53167; 1,000 h | Creep corrosion WD 3 cracking | No creep corrosion no cracking |
| Condensation water test DIN 50017; 1,000 h | no damage detectable | no damage detectable |
| Resistance to light (only top coating) | Gardner gloss values 20° 60° chalking | 20° 60° chalking |
| Xeno 1200 | | |
| −0 h | 86 94 0 | 65 90 0 |
| −500 h | 77 92 0 | 58 89 0 |
| −1,000 h | 70 89 0 | 56 89 0 |
| −1,500 h | 56 84 0 | 53 89 0 |
| −2,000 h | 45 81 0 | 52 89 0 |
| QUV (UVB 313) | | |
| −0 h | 72 91 0 | 63 90 0 |
| −500 h | 46 84 0 | 26 73 0 |
| −1,000 h | 26 70 0 | 12 56 0 |
| −1,500 h | 24 69 0 | 05 41 0 |
| −2,000 h | 15 59 0 | 00 33 0 |

*7d-RT: drying for 7 days at room temperature
**Resistance to solvents: 0 = very good, 5 = very poor The coating produced with the coating composition according to the invention also remained crack-free upon exposure to heat in contrast to coating prepared from the coating composition of Example 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising:
A) 25 to 50 wt. % of a polyisocyanate component,
B) 5 to 20% wt. % of one or more polyamines corresponding to formula II:

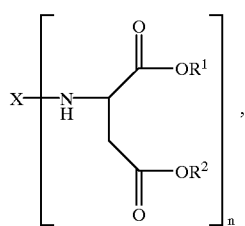

(II)

wherein
X represents an n-valent radical which is inert towards isocyanate groups and is obtained by removing the primary amino groups from an organic polyamine having a number average molecular weight of 88 to 400 and containing n primary (cyclo)aliphatically bound amino groups,
$R^1$ and $R^2$ are identical or different and represent organic radicals having 1 to 18 carbon atoms and
n represents an integer of at least 2,
C) 10 to 30 wt. % of one or more compounds having a number average molecular weight of 112 to 600 and corresponding to formula III:

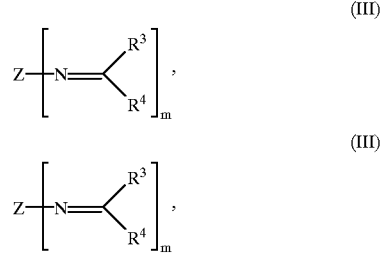

wherein
$R^3$ and $R^4$ are identical or different and represent hydrogen or organic radicals having 1 to 18 carbon atoms and
Z represents an m-valent radical which is inert towards isocyanate groups and is obtained by removing the primary amino groups from an organic polyamine having a number average molecular weight of 88 to 400 and containing m primary (cyclo)aliphatically bound amino groups and
m represents an integer of ≧2,
D) 0.1 to 5.0 wt. % of an acetal corresponding to formula IV:

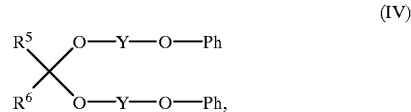

(IV)

wherein
$R^5$ and $R^6$ are identical or different and represent hydrogen or organic radicals having 1 to 18 carbon atoms,
Y represents a divalent organic radical having 1 to 8 carbon atoms and
Ph represents an optionally substituted phenyl radical wherein the optional substituents are selected from the group consisting of Cl, Br, or $C_1$–$C_4$-alkyl,
E) 0.1 to 5.0 wt. % of castor oil.
F) 0.1 to 10.0 wt. % of an organic solvent,
G) 15 to 35 wt. % of a pigment and
H) 0 to 10 wt. % of a coating additive other than D, F or G, wherein the sum of the percentages of components A to H is 100.

2. The coating composition of claim 1 wherein polyisocyanate component A is a polyisocyanate which contains isocyanurate groups, is prepared from hexamethylene diisocyanate and has a maximum viscosity of 5,000 mPa.s/23° C. and an NCO content of 16 to 24 wt. %.

3. The coating composition of claim 1 wherein
X represents a divalent hydrocarbon radical obtained by removing the amino groups from 1-amino-3,3,5-trimethyl-5-aminomethylcyclohexane, 4,4'-diaminodicyclohexyl methane,3,3,'-dimethyl-4,4'-diaminodicyclohexyl methane, hexahydro-2,4- and/or 2,6-diaminotoluene, the isomeric C-monomethyl-diaminodicyclohexylmethanes or 3(4)-aminomethyl-1-methylcyclohexylamine
and $R^1$ and $R^2$ represent a methyl, ethyl, n-butyl or 2-ethylhexyl group.

4. The coating composition of claim 2 wherein

X represents a divalent hydrocarbon radical obtained by removing the amino groups from 1-amino-3,3,5-trimethyl-5-aminomethylcyclohexane, 4,4'-diaminodicyclohexyl methane, 3,3'-dimethyl-4,4'-diaminodicyclohexyl methane, hexahydro-2,4- and/or 2,6-diaminotoluene, the isomeric C-monomethyl-diaminodicyclohexyl-methanes or 3(4)-aminomethyl-1-methylcyclohexylamine
and $R^1$ and $R^2$ represent a methyl, ethyl, n-butyl or 2-ethylhexyl group.

5. The coating composition of claim 1 wherein

X represents a hydrocarbon radical obtained by removing the amino groups from 3,3'-dimethyl-4,4'-diaminodicyclohexyl-methane and $R^1$ and $R^2$ represent an ethyl group.

6. The coating composition of claim 2 wherein

X represents a hydrocarbon radical obtained by removing the amino groups from 3,3'-dimethyl-4,4'-diaminodicyclohexyl-methane and $R^1$ and $R^2$ represent an ethyl group.

7. The coating composition of claim 1 wherein $R^3$ represents a hydrogen atom and $R^4$ represents a hydrocarbon radical having 1 to 8 carbon atoms.

8. The coating composition of claim 2 wherein $R^3$ represents a hydrogen atom and $R^4$ represents a hydrocarbon radical having 1 to 8 carbon atoms.

9. The coating composition of claim 3 wherein $R^3$ represents a hydrogen atom and $R^4$ represents a hydrocarbon radical having 1 to 8 carbon atoms.

10. The coating composition of claim 4 wherein $R^3$ represents a hydrogen atom and $R^4$ represents a hydrocarbon radical having 1 to 8 carbon atoms.

11. The coating composition of claim 1 wherein Z represents a hydrocarbon radical obtained by removing the amino groups from 1-amino-3,3,5-trimethyl-5-aminomethylcyclohexane.

12. The coating composition of claim 1 wherein

Z represents a hydrocarbon radical obtained by removing the amino groups from 1-amino-3,3,5-trimethy-5-amino-methylcyclohexane, $R^3$ represents hydrogen and $R^4$ represents an isopropyl radical.

13. The coating composition of claim 1 wherein component D comprises bis(2-phenoxyethyl)formal.

14. The coating composition of claim 1 wherein said coating composition contains:

30 to 45% of component A, 5 to 15% of component B, 10 to 20% of component C, 0.1 to 3% of component D, 0.1 to 4% of component E, 0.1 to 5% of component F, 20 to 30% of component G and 1 to 8% of component H.

* * * * *